April 22, 1958 W. B. WEIS 2,831,373
VARIABLE SPEED FRICTION GEARING
Filed June 11, 1953

INVENTOR.
William B. Weis

United States Patent Office

2,831,373
Patented Apr. 22, 1958

2,831,373

VARIABLE SPEED FRICTION GEARING

William B. Weis, Chicago, Ill., assignor to Graham Transmissions, Inc., Menomonee Falls, Wis., a corporation of Delaware Application June 11, 1953, Serial No. 361,004

1 Claim. (Cl. 74—796)

This invention relates to improvements in variable speed motion and power transmission devices, more particularly, to an epicyclic or planetary type of frictional gearing variable speed transmission.

It is an object of the invention to provide a reduction friction gearing power transmission wherein the ratio of speed of rotation of the power input thereof to the power output of the same may be selectively regulated and effectually maintained through the novel arrangement and usage of a minimum number of working parts and their simple adjustment.

It is also an object of the invention to provide a gearing of the stated character which is of durable, rugged and simple construction, efficient and quiet in operation, and economical in maintenance.

The foregoing, as well as other objects, advantages and meritorious teachings of my invention, will be in part obvious and in part pointed out in the following detailed disclosure thereof, when taken in conjunction with the accompanying drawings, it being understood that the forms of the invention presented herein are precise and what are now considered to be the best modes of embodying its principles, but that other modifications and changes may be made in specific embodiments without departing from its essential features.

Figure 1:
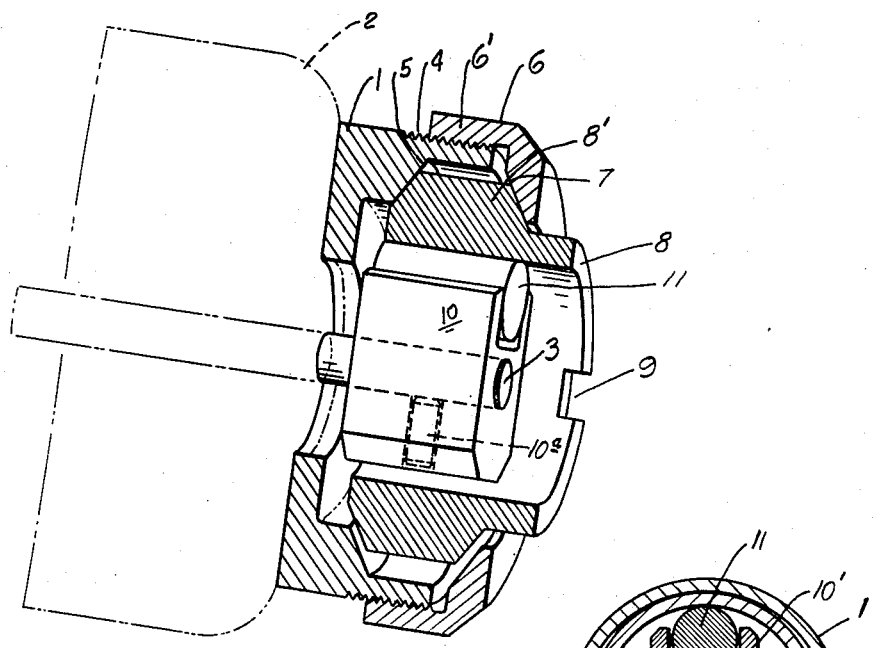
Figure 1 is a sectional perspective view of the invention.
Figure 2:
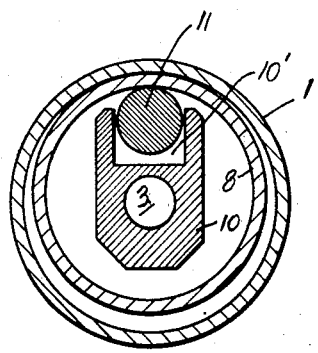
Figure 2 is a schematic sectional view of said invention showing the relative arrangement of the motion transmitting parts thereof, and, Figure 3 is a fragmentary sectional perspective view of a modified form of the invention, particularly, a modified form of the motion transmitting coupling member thereof.

Referring in detail to the accompanying drawings and in particular, to that form of my invention illustrated by the Figures 1 and 2 of the same, 1 indicates a nonrotatable circular housing fixed to a suitable portion of a prime mover 2 (shown in dot and dash lines). A power input or driving shaft 3 extends from the prime mover into and concentrically of the housing via an appropriately sized opening in its side preferably, but not necessarily, terminating beyond its open outer side.

The outer side of the housing, as stated above, is open. The outer periphery thereof is screw-threaded, as at 4, while its inner periphery is smooth and substantially parallels the outer; the inner side wall thereof being angled or pitched, as indicated at 5.

An outer side wall in the form of a circular cap-like member 6 whose flange or side wall 6' is internally screw-threaded and of an inside diameter substantially corresponding to the outside diameter of the housing 1, is provided to said housing. It is adapted to be threadedly engaged with and over the same in the manner shown in Figure 1.

The outer wall of the cap-like member has a concentric opening through the same and also, has its inner side angled or pitched, as at 7, to a degree corresponding to the pitch of the inner side wall 5 of the housing and is opposite the same.

From the foregoing, it will be understood that my invention includes a housing assembly consisting of the housing (per se) 1 and the outer side wall constituting cap-like member 6; further, that the opposite sides of such assembly are open, first, to permit entrance of the driving shaft 3 thereinto, and second, the extension of a driven member (hereinafter more fully described) therefrom, with each in coaxial relationship.

Because of the formation of the inner periphery of the housing 1, its pitched inner side wall 5, and the correspondingly pitched inner side 7 of the outer wall cap-like member 6, a pitched raceway is provided within the aforesaid housing assembly. Moreover, it is important to here note that by threadedly turning the outer wall cap-like member 6 in a predetermined direction on and with relation to the housing 1, the width or breadth of said pitched raceway can be selectively varied, purpose of which will be hereinafter more fully described.

A driven member 8 comprising a circular sleeve-like body whose diameter is less than the inside diameter of the housing assembly, is rotatably or rollingly received therein. The length of said member is greater than that of the housing assembly. Consequently, its outer end portion extends through and beyond the cap-like member 6.

The normally inward peripheral portion of the assembly driven member is thickened, as at 8', and has its opposite sides angled or pitched at a degree corresponding to the degrees of pitch of the housing assembly inner wall 5 and inner side 7. The outer periphery of the thickened portion is plane as is the inner periphery of the driven member, while the extended outer end of said driven member is notched or toothed as at 9, or otherwise suitably treated whereby its driving connection with a device or member (not shown) may be effected.

To cause the transmission of rotary motion from the driving shaft 3 to the driven member 8 a coupling 10 is employed. It consists of a block or like device, of less width than the inside diameter of the sleeve-like driven member, axially mounted on the extended end portion of the driving shaft 3 and secured thereto by a lock screw 10a threadedly engaged therethrough and with an adjacent portion of said shaft. Thus, the coupling rotates with the shaft and within the driven member 8. An upwardly opening pocket 10' is formed in one side and throughout the length of the coupling. Rotatably and slideably received in the pocket is a roller 11, the diameter of which is preferably greater than the depth of said pocket (see Figure 2). The periphery of the roller lies parallel to and, at times, rollingly contacts the inner periphery of the driven member 8.

In operation, the shaft 3 is driven by the prime mover 2 causing the coupling 10 to be rotated within the housing assembly. Centrifugal force generated by the rotating coupling impels outward movement of the roller 11 with relation to the pocket 10' of said coupling. Thereby, the periphery of the roller is outwardly thrustingly and frictionally engaged with the inner peripheral surface of the driven member 8. Because of such engagement, said driven member, of less diameter than that of the aforesaid pitched raceway within the housing assembly, is thrust into spot bearing or rolling contact with an adjacent portion of the pitched raceway. Due to the orbital path of travel of the roller carried by the rotating coupling 10 and the maintenance of its outward thrust to and frictional contact with the driven member 8, said member effects a like path of travel on and about the housing assembly raceway. Hence, it is rotated.

This rotary motion may be translated into rotary motion about an axis concentric with the drive shaft by means of an Oldham coupling or by a series of Hooke joints, not shown.

To change or vary the speed of rotary motion take-off from the driven member 8, selective adjustment of the cap-like member 6 is effected with relation to the screw-threaded periphery 4 of the housing 1. By turning said cap-like member inwardly on this screw-threaded periphery, the area of the assembly raceway is decreased to the extent that the pitched side 7 is moved toward the immovable pitched side wall 5. Thereby, the width of the raceway is decreased and the area of contact between said pitched sides and the opposite and pitched sides of the thickened peripheral portion 8' of the driven member 8 is proportionately decreased. Continued decrease, as above, will ultimately result in an extreme condition or relationing between the raceway and the driven member 8. The diameter of the raceway and the outside diameter of the driven member 8 will become substantially the same and will be concentric one with relation to the other. In this instance, the rolling orbital motion of the driven member 8 within said raceway is reduced to zero or substantially zero. That is, it remains still to the extent that it does not roll in the aforesaid raceway, while the driving shaft 3 and the coupling 10 are rotating at fixed speeds. Conversely, by turning the cap-like member 6 outwardly on the screw-threaded periphery 4 of the housing 1, the area of the assembly raceway is increased to the extent that its pitched side 7 is moved away from the immovable pitched side 5 of the housing 1. Accordingly, the width of the raceway is increased and the area of contact between said pitched sides and the opposite and pitched sides of the thickened peripheral portion 8' of the driven member is proportionately increased. Therefore, the rate of orbital travel or rolling of the driven member will be increased. Thus, motion take-off from the driven member 8, under such operation circumstances, will be increased.

By varying the extent or degree of adjustment of the cap-like member 6 inwardly or outwardly on the housing screw-threaded portion 4, so too will there be varied the speed of rotation of the driven member 8 and the velocity of its power output. To such end, the invention is capable of satisfactorily functioning as a friction reduction gearing.

Figure 3:
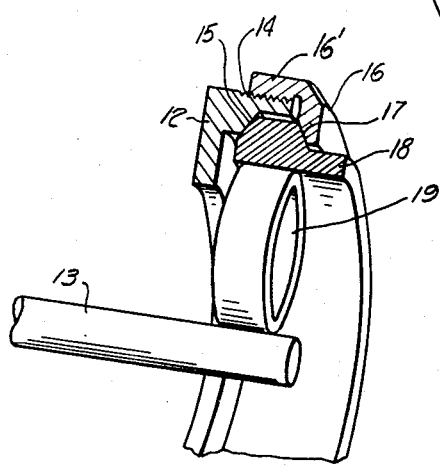

In the Figure 3 of the drawings, I have shown a modified form of the invention, again embodying frictional gearing of the epicyclic type. The embodiment comprises a non-rotatable housing 12 adapted to be carried by a suitable prime mover (not shown) from which a driving shaft 13 extends. The outer side of the housing is open and is externally peripherally screw-threaded as at 14. Its inner periphery is smooth and the outer portion thereof substantially parallels the outer periphery, while the inner side wall of the same is angled or pitched, as at 15.

A circular cap-like member 16, whose flange or side wall 16' is internally screw-threaded and of an inside diameter substantially corresponding to the outside diameter of the housing 12, is threadedly engaged with and over said housing, as is clearly shown in said Figure 3. It is turnable either inwardly or outwardly with respect to the housing.

The outer wall of this member 16 is partially open and its inner side wall is angled or pitched, as at 17, to a degree substantially corresponding to the pitch of the inner side wall 15 and, as shown, is opposite thereto.

A driven member 18, consisting of a circular sleeve-like body of a diameter less than the inside diameter of the housing 12 is rotatably or rollingly received in said housing; its length being such as to preferably, though not necessarily, extend through and beyond the opening in the cap-like member 18.

As in the instance of the driven member 8, the normally inward peripheral portion of the driven member is thickened and has its opposite sides angled or pitched at a degree corresponding to the degrees of pitch of the housing assembly walls 15 and 17, while the outer peripheral surface of this thickened portion is plane, as is the inner peripheral surface of the driven member. The driven member 18 is adapted for coupling to a driven shaft through an Oldham coupling, for example.

To effect power transmitting coupling between the driving shaft 13 and the driven member 18, an annulus 19, of appropriate diameter and made of inherently resilient or spring material is interposed between the inner peripheral surface of the driven member 18 and the housing received or extended portion of the driving shaft 13. It frictionally engages with each thereof. In consequence, with rotation of the driving shaft 13, rotary motion will be transmitted from the same to the driven member 18. The inherent resilient or spring properties of the annulus 19 are such that the driven member 18 will be thrust into spot bearing or rolling contact with adjacent portions of the pitched raceway within the housing assembly constituted by the pitched, and above described, side walls 15 and 17. Thereby, the driven member 18 will be rotated and moreover, will travel through an orbital path about and over the said raceway of the housing assembly. As indicated above, the inherent resiliency or spring of the annulus 19 is entirely sufficient to impart a constant thrust to the driven member 18 and so, insure its maintenance in the aforesaid rolling orbital path of movement within the housing assembly.

By turning the cap-like member 16 inwardly or outwardly on the screw-threaded portion 14 of the housing 12, it will be seen that the width of the housing assembly raceway will be decreased or increased. Being increased, the area of said raceway will be enlarged. Being decreased, the area of the raceway will be decreased. Thus, the rate of orbital travel or rolling of the driven member 18 over and about the raceway (driven at a fixed speed from the driving shaft 13 via the annulus 19) will be capable of selective variation, i. e., increased or decreased.

I claim:

A power transmission comprising, a housing having a circular raceway, a drive shaft in the housing concentric with the raceway, a block on the shaft and having a radial slot therein, a roller in the slot adapted to move radially under influence of centrifugal force and to rotate within the slot about the axis of the roller, said axis being parallel to the shaft axis, a circular driven member having a smaller outside diameter than the inside diameter of the raceway and made to roll about the inside of the raceway by the roller acting on the driven member.

References Cited in the file of this patent

UNITED STATES PATENTS

| | | |
|---|---|---|
| 885,354 | Loguin | Apr. 21, 1908 |
| 1,568,290 | Morison | Jan. 5, 1926 |
| 1,770,408 | Jacobsen | July 15, 1930 |
| 2,178,395 | Jepson | Oct. 31, 1939 |